United States Patent
Gross

(10) Patent No.: US 9,507,878 B2
(45) Date of Patent: Nov. 29, 2016

(54) SOCIAL SEARCH SYSTEM AND METHOD

(71) Applicant: John Nicholas Gross, Berkeley, CA (US)

(72) Inventor: John Nicholas Gross, Berkeley, CA (US)

(73) Assignee: John Nicholas and Kristin Gross Trust, Berkeley, CA (US)

( * ) Notice: Subject to any disclaimer, the term of this patent is extended or adjusted under 35 U.S.C. 154(b) by 0 days.

(21) Appl. No.: 14/087,400

(22) Filed: Nov. 22, 2013

(65) Prior Publication Data

US 2014/0081943 A1 Mar. 20, 2014

Related U.S. Application Data

(63) Continuation of application No. 11/855,934, filed on Sep. 14, 2007, now abandoned.

(60) Provisional application No. 60/826,677, filed on Sep. 22, 2006.

(51) Int. Cl.
*G06F 17/30* (2006.01)
*G06Q 50/00* (2012.01)
*G06Q 30/02* (2012.01)

(52) U.S. Cl.
CPC ....... *G06F 17/3097* (2013.01); *G06F 17/3053* (2013.01); *G06F 17/30699* (2013.01); *G06F 17/30867* (2013.01); *G06Q 30/02* (2013.01); *G06Q 30/0255* (2013.01); *G06Q 30/0256* (2013.01); *G06Q 30/0269* (2013.01); *G06Q 30/0273* (2013.01); *G06Q 50/01* (2013.01)

(58) Field of Classification Search
CPC ............... G06F 17/30864; G06F 17/30867; G06F 17/30067

USPC ......................................... 707/705
See application file for complete search history.

(56) References Cited

U.S. PATENT DOCUMENTS

| | | | |
|---|---|---|---|
| 6,405,190 B1* | 6/2002 | Conklin | G06F 17/30684 |
| 6,438,579 B1 | 8/2002 | Hosken | |
| 6,460,034 B1* | 10/2002 | Wical | G06F 17/30675 |
| 6,493,703 B1 | 12/2002 | Knight et al. | |
| 6,513,031 B1* | 1/2003 | Fries | G06F 17/30398 |
| 7,069,308 B2 | 6/2006 | Abrams | |
| 7,509,295 B2 | 3/2009 | Rokosz et al. | |
| 7,668,821 B1* | 2/2010 | Donsbach | G06F 17/30867 |
| | | | 707/765 |
| 7,680,770 B1 | 3/2010 | Buyukkokten et al. | |
| 7,783,592 B2 | 8/2010 | Armstrong et al. | |
| 7,827,208 B2 | 11/2010 | Bosworth et al. | |
| 7,856,658 B2 | 12/2010 | James | |
| 8,156,113 B2 | 4/2012 | Aravamudan et al. | |
| 8,380,726 B2 | 2/2013 | Aravamudan et al. | |
| 8,504,575 B2 | 8/2013 | Koran et al. | |

(Continued)

OTHER PUBLICATIONS

Foley, John, "Aggregate Knowledge Aims to Be a Mind Reader on the Web," http://www.informationweek.com/blog/main/archives/2007/08/aggregate_knowl.html, Aug. 27, 2007, 2 pages.

(Continued)

*Primary Examiner* — James E Richardson
(74) *Attorney, Agent, or Firm* — PatentBest; Andrew McAleavey

(57) ABSTRACT

A search system generates customized search results for social network members. The results are responsive to queries and are personalized based on members' explicit and implicit interests derived from user actions, content selections, etc.

19 Claims, 1 Drawing Sheet

(56) References Cited

U.S. PATENT DOCUMENTS

| | | | |
|---|---|---|---|
| 8,510,298 | B2 | 8/2013 | Khandelwal |
| 2004/0103092 | A1 | 5/2004 | Tuzhilin et al. |
| 2004/0210661 | A1* | 10/2004 | Thompson .................... 709/228 |
| 2006/0004627 | A1 | 1/2006 | Baluja |
| 2006/0004713 | A1* | 1/2006 | Korte et al. ...................... 707/3 |
| 2006/0143236 | A1* | 6/2006 | Wu ............................ 707/104.1 |
| 2006/0218153 | A1 | 9/2006 | Voon et al. |
| 2007/0050354 | A1 | 3/2007 | Rosenberg |
| 2007/0073837 | A1* | 3/2007 | Johnson-McCormick et al. ............................. 709/217 |
| 2007/0203790 | A1 | 8/2007 | Torrens et al. |
| 2007/0208729 | A1 | 9/2007 | Martino |
| 2007/0214133 | A1 | 9/2007 | Liberty et al. |
| 2007/0265870 | A1 | 11/2007 | Song et al. |
| 2007/0266026 | A1 | 11/2007 | Aravamudan et al. |
| 2007/0266048 | A1 | 11/2007 | Prosser et al. |

OTHER PUBLICATIONS

McCallum, Andrew et al., "The Author-Recipient-Topic Model for Topic and Role Discovery in Social Networks: Experiments with Enron and Academic Email," Technical Report UM-CS-2004-096, University of Massachusetts Amherst, Dec. 11, 2004, 16 pages.

Revenue Science Press Release, Dec. 4, 2007, 1 page.

Adomavicius, Gediminas et al, "Incorporating Contextual Information in Recommender Systems Using a Multidimensional Approach," Preprint of article published in ACM Transactions on Information Systems (TOIS) archive vol. 23, Issue 1 (Jan. 2005), 49 pages.

Bonhard et al., "Knowing me, knowing you'—Using profiles and social networking to improve recommender systems," BT Technology Journal, vol. 24, Issue 3, pp. 84-98, Jul. 2006.

Yang et al., "Mining Social Networks for Targeted Advertising," Proc. 39th Hawaii International Conference on System Sciences, pp. 1-10, Jan. 2006, IEEE.

* cited by examiner

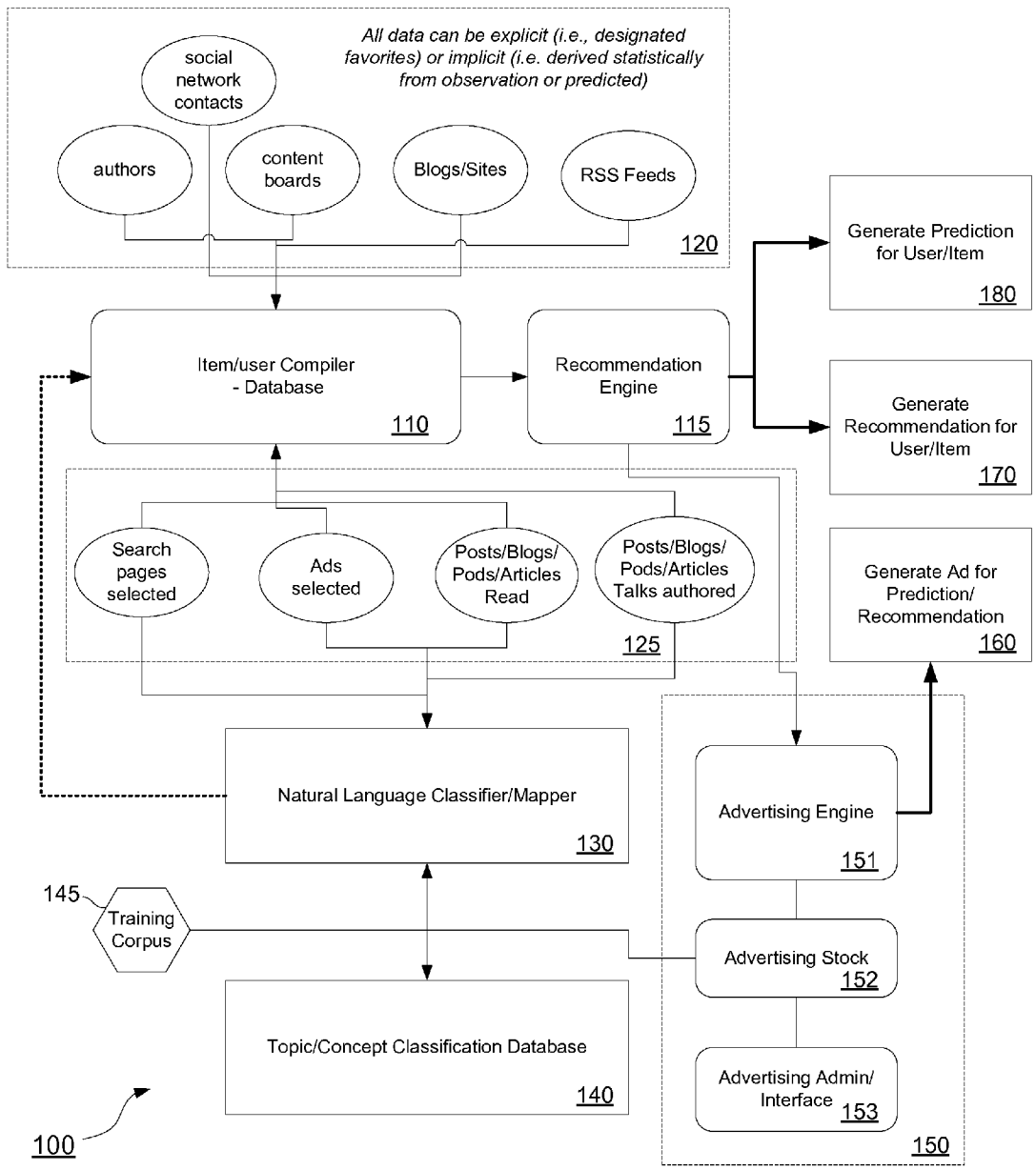

SOCIAL SEARCH SYSTEM AND METHOD

RELATED APPLICATION DATA

The present application is a continuation of and claims priority to Ser. No. 11/855,934 filed Sep. 14, 2007, which in turn claims the benefit under 35 U.S.C. 119(e) of the priority date of Provisional Application Ser. No. 60/826,677 filed Sep. 22, 2006; both of which are hereby incorporated by reference herein.

FIELD OF THE INVENTION

The present invention relates to search systems used in social networking system.

BACKGROUND

Recommender systems are well known in the art. In one example, such systems can make recommendations for movie titles to a subscriber. In other instances they can provide suggestions for book purchases, or even television program viewing. Such algorithms are commonplace in a number of Internet commerce environments, including at Amazon, CDNOW, and Netflix to name a few, as well as programming guide systems such as TiVO.

Traditionally recommender systems are used in environments in which a content provider is attempting to provide new and interesting material to subscribers, in the form of additional products and services. In some cases (see e.g., U.S. Pat. No. 6,493,703 incorporated by reference herein) recommenders have been employed for the purpose of informing members of an online community of content and/or preferences of other members. Nonetheless the use of recommenders has not been extended fully to such domains and other online areas, including social networks, which could benefit from such systems. Only recently for example have recommenders been proposed for generating user to user recommendations in a music related community. See e.g., US Publication No. 2007/0203790 to Torrens, incorporated by reference herein. Similar systems which recommend content/users are described in U.S. Pat. No. 6,493,703 to Knight et al., also incorporated by reference herein.

Multi-dimensional recommenders have also been recently introduced. For an example of such systems, please see U.S. Patent Publication No. 2004/0103092 to Tuzhilin et al. and an article entitled "Incorporating Contextual Information in Recommender Systems Using a Multidimensional Approach" to Adomavicius et al., both of which are hereby incorporated by reference herein. In such systems, however, the extra dimensionality arises from additional content related to items which are nonetheless still traditional commerce items, such as movies.

SUMMARY OF THE INVENTION

An object of the present invention, therefore, is to reduce and/or overcome the aforementioned limitations of the prior art. A recommender system which evaluates multiple data sources is employed to generate more accurate and relevant predictions concerning data items and other users within a community.

DESCRIPTION OF THE DRAWINGS

FIG. 1 is an illustration of a multi-dimensional recommender system of the present invention.

DETAILED DESCRIPTION

FIG. 1 illustrates an example of a preferred embodiment of a multi-dimensional recommender system 100. A user/item compiler and database 110 includes a schema in which ratings for individual items by individual users are identified in a typical matrix fashion well-known in the art. The primary difference, in this instance, is that the items are not products/services (i.e., books, movies, etc.) as in the prior art, but instead represent more generalized concepts, such as a rating identified by a user for an author, a social network contact, a particular message board or post, a particular blog or website, a particular RSS Feed, etc., as shown by the data received from sources.

Explicit Endorsement Data Sources 120

As an example of an explicit data source 120, in a typical message board application such as operated by Yahoo! (under the moniker Yahoo Message Boards) or the Motley Fool, users are permitted to designate "favorite" authors, and/or to "recommend" posts written by particular individuals. In accordance with the present invention these designations of favorite authors and recommendations for posts are monitored, tabulated, and then translated into ratings for such authors/posts and compiled in a database under control of an item/user compiler module. The ratings will be a function of the environment in which the information is collected of course, so that a recommendation by person A for a post written by person B can be scored as a simple 1 or 0. While current message board systems presently track these kinds of endorsements, it will be understood that the invention can be applied to any aspect of such environments in which subscribers are allowed to endorse, rate, or declare an interest or preference for a certain author, post, subject, etc.

The purpose of using a recommender algorithm (either collaborative filter or content filter as the case may require) would be of course to recommend additional authors, topics, or similar subject matter to members of such message boards based on their professed interests in other authors and topics. For example a first individual with favorite authors A, B, C may not realize that other individuals designating A, B, C as favorite authors also designate D and E as favorite authors, and this information can be passed on to such first individual increase the potential enjoyment of such site.

Similarly in other environments as data source a user's designation of favorite web-logs (blogs), favorite RSS feeds, etc. as evidenced by their inclusion in an RSS aggregator or as designated favorites within a web browser, or by some other mechanism could be similarly tabulated to create a user-item matrix of ratings for such items. This can be used to pass on recommendations for new blogs, RSS feeds, etc.

In some applications an e-commerce site includes social networking features whereby members link to each other explicitly as part of groups. For example in sites operated by Myspace, or Netflix, members can designate other members explicitly with the label friends. As with the other data sources, these user-friend associations can be tabulated into a form suitable for use by a recommendation algorithm. Again, while these sites specifically designate individuals as friends, other sites may allow members to designate some other favorite item, such as an image, a website, a video, etc.

It should be apparent therefore that the item/user compiler database may in fact be comprised of several different dedicated files unique to a particular site or domain of users.

Implicit Endorsement Data Sources 125

In contrast to explicit data sources, the data from implicit data sources 125 includes materials which typically must undergo further processing to determine both the item and the associated rating. That is, in the case of a search result for example, the item may be one of the pages presented in the search result, or one or more concepts derived from the content of such page. The rating may be based on a number of invocations of such page, a length of time spent at such page, or any other well-known attention metric used to determine a person's interest in a particular website.

Other sources of implicit data can include ads selected by an individual (during an online session or from another electronic interface which collects and presents ad related data, such as a Tivo box or the like), audio/video content, posts, blogs, podcasts, articles, stories and the like which are read and/or authored by the person. Those skilled in the art will appreciate that such monitorings could be done in any situation where a person's selections can be identified.

Natural Language Classifier 130

Regardless of the source of the implicit data, the invention uses a natural language classifier/mapper module 130 to translate the raw data into one or more predefined concepts—representing the items in this instance—with reference to a topic/concept classification database 140. For example, a topic/concept may include such items as personal interests/hobbies, music bands, company names, stock symbols, brand names, foods, restaurants, movies, etc., depending on the intended application. These are but examples of course and it will be understood that such topics/concepts could include almost anything.

The items for the recommender database 140 can be mapped onto the topics/concepts either on a 1:1 basis, a 1:N basis, or an N:1 basis. In other words, if an item in the recommender database 140 is designated with the label "Sony," there may be an identical entry in the topic/concept classification with such term. Semantic equivalents may also be used where appropriate. Similarly a single item "Sony" may be associated with multiple topics/concepts, such as a reference to a particular product or service offered by such company (for example Vaio) a stock symbol for Sony, a reference to a key employee/officer of Sony, and the like. Conversely some topics/concepts may also be mapped to multiple items, so that a reference to Sony Vaio may be linked to such items as Sony and personal state of the art computers.

The natural language classifier/mapper 130 is preferably trained with a training corpus 145 so that it can effectively learn the correct correlations between data and concepts. After training, the natural language classifier/mapper 130 can recognize words/phrases within a search page, ad, post, etc., and correlate them to one or more topics/concepts. Thus if a document contains the word Dell, the NL classifier can be taught to recognize such word as corresponding to such concepts as a particular brand name, a computer company, and the like.

The advantage of such approach, of course, is that documents authored/reviewed by individuals do not have to contain specific or explicit references to the item in question. Thus the system understands that an individual reading articles about Porsches, Ferraris, etc, is probably interested in high end sports cars, luxury items, etc. While NL classifiers are well-known and have been used in other contexts such as search engines and related indices, they do not appear to have been used to date to assist in the identification and rating of items for a recommender.

Ratings

As alluded to earlier the ratings in the above types of applications can be based on any convenient scale depending on the source of the data and the intended use. Some designations may be rated or scaled higher than others, depending on their recency, relative use, etc. The weightings again can be based on system performance requirements, objectives, and other well-known parameters. Thus with all other things being equal, older designations may receive higher scores than more recent designations, so long as the former are still designated as active in the user's day to day experience. So for example, after a predefined period, the first designated favorite author for a particular individual may receive a boosting to their rating if such author is still being read by the individual. Similarly, "stale" endorsements may be reduced over time if they are not frequently used. The degree of activity may be benchmarked to cause a desired result (i.e., endorsements receiving no activity within N days may receive a maximum attenuation factor) monitored to attenuate the ratings.

Quantitatively, the ratings therefore can be a simple mathematical relationship of usage frequency and age of the endorsement. The ratings may also be affected by the context in which they are generated, or in which the recommendation is solicited, as noted in the Tuzhilin materials above. The ratings can be updated at any regular desired interval of time, such as on a daily, weekly, or other convenient basis. For example, one approach may use the product of (frequency of use*age of the endorsement), with some normalization applied. This will result in an increase in score for older and more frequently used items. Other types of algorithms will be apparent to those skilled in the art. In this respect the invention attempts to mimic the behavior of a learning network which gives precedence to connections which are more strongly connected and reinforced regularly.

Recommendation Engine Module 115 Outputs

A recommendation engine module 115 thus generates outputs in a conventional fashion using a collaborative filtering algorithm, a content based filtering algorithm, or some combination therefore depending on the particular application and the data available in the item/user database. The outputs can include:

1) predictions on how much particular users will like particular items; for example, in a message board application, an indication of a rating at output 180 that a particular person would give to a specific post, specific author, specific topic, etc.;

2) recommendation outputs 170 on specific authors, topics, posts, etc. which a particular person may want to consider for review in their perusings at such site; this data can be presented to a user in the form of individual entries, top x lists, etc.

3) an output to adjust, adapt or personalize search engine (not shown) results presented to a user in response to a query on a specific subject. For example if a user performed a search at a site relating to video recorders, the result set typically includes a set of N distinct hits. The information from the recommendation engine 115 may be used to tailor the results more particularly to the user.

In a first instance, the user has a prior profile which can be determined and exploited from item/user database 110, so that the search results are modified accordingly. As an example, the user may have expressed a favorable interest, endorsement or inclination towards Sony. This data in turn could be used to optionally modify, bias or alter the N distinct hits to accommodate the prior experiences.

In a second instance, even if the user does not have a profile, the query can be compared against items in the item/user database to determine favored or highly rated articles. Thus, in the above example, any ratings for Sony, or other video recorder suppliers, could be evaluated to identify additional modifications to the search engine results. In this manner a recommender can supplement the performance of a search engine based on real world experiences and thus increase the chances of successful experiences by searchers.

To map search queries to items for the above enhancements, the topic/concept classification database 140 can be consulted as needed. Again this may result in a number of item related entries being used to modify the search results.

It should be apparent that the output could be used by a separate recommender system, as well, to supplement an existing data set.

Advertising Module 150

An advertising module 150 can be used to provide relevant advertising material based on the content of predictions, recommendations and other outputs of the recommendation engine. As seen in FIG. 1, an interface routine 153 permits third parties and site operators to enter well-known advertising campaign information, such as advertising copy/content, desired keywords, and other information well-known in the art. The ads can take any form suitable for presentation within an electronic interface, and may include text and multi-media information (audio, video, graphics, etc.)

In prior art systems ads are correlated to search engine results, such as in a system known as "Adwords" offered by Google. In such applications ads are presented to searchers based on one or more topics identified in a search query.

The present invention extends this concept to recommenders, so that ads are served in accordance with a topic determined from a recommendation. For example, on a message board application, if the system were to determine that (based on prior ratings for certain topics) the user should also be recommended to review content on a board devoted to vintage cars, the ads presented with such recommendation could be tailored to content of such vintage car board, and/or to the specific content of the recommendation itself.

As seen in FIG. 1, the advertising stock 152 offered by third parties is matched against one or more topics/concepts in the topic/concept classification database 140. The mapping of the advertising stock to such topics can again be done automatically by natural language classifier/mapper 130, or alternatively selected independently by the third party/system site operator. In the latter case some oversight may be necessary to prevent third parties from intentionally polluting the relevancy of ads by presenting them in inappropriate contexts.

An advertising engine 151 is invoked and cooperates with a recommendation engine 115 so that relevant ads are presented with an output of the latter. As noted above such ads may also be presented as suitable for inclusion with a modified set of search results for a search engine. In this fashion an advertising system can be superimposed over the recommender system, so that relevant ads are presented at 160 in response to, and in conjunction with, a recommendation, prediction, etc., either at the same time, or at a later time in the form of emails, alerts, printed copy or other suitable materials for consumer consumption.

Applications

As alluded to earlier, the present invention can be used advantageously in a number of e-commerce applications, including:

Message boards: the invention can be employed to predict/recommend other authors, posters, topics, etc., which would be of interest to members;

Social networking: the invention can be employed to predict/recommend other contacts, "friends," topics, etc. which a member of an online community may enjoy based on such member's other friends, topics reviewed, etc. By measuring an adoption rate between members for particular friends, or determining which friends' interests are most often copied, the system can even provide suggestions to specific members so that they send invitations to other members predicted to be good candidates for friends within the community.

RSS, Blogs, Podcasts, Ads: the invention can be employed to predict/recommend other Ads, RSS feeds, Blogs and Podcasts to individuals, based on adoptions/endorsements made by other online users.

Furthermore other options include monitoring group behavior and treating any such collection of individuals as a single entity for item/rating purposes. This aggregation can be used to recommend higher order logical groupings of individuals, particularly in social networking applications, to enhance the user experience.

That is, in conventional CF systems, individuals are automatically assigned to specific clusters based on a determination of a significant number of common interests/tastes. In the present invention the individual self-selected groupings within social networks can be broken down and treated as clusters so that comparisons can be made against particular user's interests, predilections, etc. Based on such comparisons groups can opt to extend invitations to new members which they would otherwise not notice or come into contact with. Conversely new members can be given some immediate insight into potentially fruitful social groups.

It will be understood by those skilled in the art that the above is merely an example and that countless variations on the above can be implemented in accordance with the present teachings. A number of other conventional steps that would be included in a commercial application have been omitted, as well, to better emphasize the present teachings.

It will be apparent to those skilled in the art that the modules of the present invention, including those illustrated in FIG. 1 can be implemented using any one of many known programming languages suitable for creating applications that can run on large scale computing systems, including servers connected to a network (such as the Internet). The details of the specific implementation of the present invention will vary depending on the programming language(s) used to embody the above principles, and are not material to an understanding of the present invention. Furthermore, in some instances, a portion of the hardware and software of FIG. 1 will be contained locally to a member's computing system, which can include a portable machine or a computing machine at the users premises, such as a personal computer, a PDA, digital video recorder, receiver, etc.

Furthermore it will be apparent to those skilled in the art that this is not the entire set of software modules that can be used, or an exhaustive list of all operations executed by such modules. It is expected, in fact, that other features will be added by system operators in accordance with customer preferences and/or system performance requirements. Furthermore, while not explicitly shown or described herein, the details of the various software routines, executable code, etc., required to effectuate the functionality discussed above in such modules are not material to the present invention, and may be implemented in any number of ways known to those skilled in the art.

The above descriptions are intended as merely illustrative embodiments of the proposed inventions. It is understood that the protection afforded the present invention also comprehends and extends to embodiments different from those above, but which fall within the scope of the present claims.

What is claimed is:

1. A method of presenting personalized search results to a user at a social networking site with a computing system comprising:
    (a) presenting first content to a first member of a social network at the social network site, including postings by other members, within a graphical interface, which first content is automatically determined by the computing system for said first member with a content recommendation engine based in part on:
        i) first interest information identified explicitly by said first member, and
        ii) second interest information determined implicitly from actions taken by said first member;
    wherein said first content is presented by said content recommendation engine automatically at the social networking site as output predicted and customized for said first member;
    (b) collecting and processing first ratings data for said first member with the computing system at the social network site for said first content including a first rating for a first item included in the first content;
    (d) automatically mapping said first item to a first set of one or more corresponding item topics with an automated classifier, such that the automated classifier at least considers potential 1:1, 1:N and N:1 item to item topic mappings, where N>1, in selecting the first set of corresponding item topics, said mapping including generating a classification database of items and item topics, wherein in considering potential N:1 mappings, said automated classifier associates said first item with N semantically equivalent items and maps the N semantically equivalent items to a single item topic in selecting the first set of corresponding item topics
    receiving and processing a first query at the social networking site from said first member of said social network directed to a first subject;
    wherein said first query is processed by a search engine at the social network site that is separate from said content recommendation engine;
    (e) associating said first subject with a first item topic by mapping keywords in said first query to one or more matching item topics in said classification database using a search classifier that performs said mapping the first topic being selected from among the one or more matching topics;
    (f) correlating said first subject identified from said first query to said first item with the computing system based on said first rating and said mapping of said first item to said first set of one or more corresponding item topics; and
    (g) based on results of step (f) customizing and presenting a set of search result listings to said first member responsive to said first topic, such that said set of search result listings include content related to said first item.

2. The method of claim 1, further including a step: providing an advertisement related to said first content source and/or said first item along with said set of search result listings.

3. The method of claim 1, wherein said set of search result listings includes at least one listing identifying another second member.

4. The method of claim 1, wherein said set of search result listings includes at least one listing identifying content or items rated by a second member of said social network identified as a friend of said first member.

5. The method of claim 1, wherein said mapping keywords to matching topics comprises using natural language processing.

6. The method of claim 5, wherein said mapping keywords to matching topics is done on a 1:1 basis, such that each keyword is associated with a single matching topic.

7. The method of claim 5, wherein said mapping keywords to matching topics is done on a 1:N basis, such that each keyword is associated with one or more matching topics.

8. The method of claim 5, wherein said mapping keywords to matching topics is done on an N:1 basis, such that multiple keywords are associated with a single matching topic.

9. The method of claim 5, wherein said mapping keywords to matching topics considers semantic equivalents of said keywords.

10. A method of presenting personalized search results to a user at a social networking site with a computing system comprising:
    (a) presenting first content to a first member of a social network at the social network site including postings by other members within a graphical interface, which first content is automatically determined by the computing system for said first member with a content recommendation engine based in part on:
        (i) first interest information identified explicitly by said first member, and
        (ii) second interest information determined implicitly from actions taken by said first member;
    wherein said first content is presented by said content recommendation engine automatically at the social networking site as output customized for said first member; and
    (b) collecting and processing first ratings data for said first member with the computing system at the social network site including a first rating for a first item included in the first content;
    (c) automatically mapping said first item to a first set of one or more corresponding item topics with an automated classifier, such that the automated classifier at least considers potential 1:1, 1:N and N:1 item to item topic mappings, where N>1, in selecting the first set of corresponding item topics, said mapping including generating a classification database of items and item topics, wherein in considering potential N:1 mappings, said automated classifier associates said first item with N semantically equivalent items and maps the N semantically equivalent items to a single item topic in selecting the first set of corresponding item topics;
    (d) receiving and processing a first query at the social networking site from said first member of said social network requesting items;
    wherein said first query is processed by a search engine at the social network site that is separate from said content recommendation engine;
    (e) determining, using the computing system, that the items of the first query are associated with a first item topic by mapping keywords in said first query to corresponding item topics in said classification database;
    (f) correlating said first item topic identified from said first query with a set of related item topics selected from of said first set of one or more corresponding item topics associated with the first item with the computing system based at least in part on said mapping of said first item to said first set of one or more corresponding item topics; and (g) based on results of step (f) generating and presenting a set of customized search result listings to said first member in response to said first query, such that said customized set of search result listings includes first content directed to said first item topic and second content directed to the set of related item topics.

11. The method of claim 10, further including a step: providing an advertisement related to said first content source and/or said first item along with said set of search result listings.

12. The method of claim 10, wherein said set of search result listings includes at least one listing identifying another second member.

13. The method of claim 10, wherein said set of search result listings includes at least one listing identifying content or items rated by a second member of said social network identified as a friend of said first member.

14. The method of claim 10, wherein said mapping keywords to matching topics comprises using natural language processing.

15. The method of claim 14, wherein said mapping keywords to matching topics is done on a 1:1 basis, such that each keyword is associated with a single matching topic.

16. The method of claim 14, wherein said mapping keywords to matching topics is done on a 1:N basis, such that each keyword is associated with one or more matching topics.

17. The method of claim 14, wherein said mapping keywords to matching topics is done on an N:1 basis, such that multiple keywords are associated with a single matching topic.

18. The method of claim 14, wherein said mapping keywords to matching topics considers semantic equivalents of said keywords.

19. The method of claim 10, further comprising training the automated classifier using a training corpus.

* * * * *